United States Patent [19]
Elgaard

[11] 3,918,061
[45] Nov. 4, 1975

[54] VELOCITY MEASURING DOPPLER RADAR

[75] Inventor: Christen Hagbard Elgaard, Risskov, Denmark

[73] Assignee: Terma Elektronisk Industri A/S, Denmark

[22] Filed: Sept. 25, 1973

[21] Appl. No.: 400,651

[52] U.S. Cl. .................................. 343/8; 73/167
[51] Int. Cl.² .......................................... G01S 9/44
[58] Field of Search ...................... 343/8; 73/167

[56] References Cited
UNITED STATES PATENTS

| | | | |
|---|---|---|---|
| 3,034,049 | 5/1962 | Downs | 343/8 |
| 3,365,716 | 1/1968 | Jorgensen | 343/8 |
| 3,750,170 | 7/1973 | Brown | 343/8 |

*Primary Examiner*—T. H. Tubbesing
*Attorney, Agent, or Firm*—Craig & Antonelli

[57] ABSTRACT

A Doppler Radar device for determining the muzzle velocity of an artillery projectile by counting Doppler oscillations produced by the reflection of a Doppler signal from the flying projectile so as to first count a predetermined number of oscillations from the firing moment until the projectile reaches a first measuring point or portion of its trajectory, then for velocity measuring purposes counting a smaller number of oscillations and registering the duration of this counting, letting the projectile fly further to a second measuring point or portion of the trajectory and repeating the velocity measurement therein. In order to obtain an accurate result of the muzzle velocity the device according to the invention is so adapted that it registers the length of the time interval between the firing and the first measuring point whereafter this registration is used as a master for determining the time interval between the first and the second measuring point in such a manner that irrespectively of the absolute lengths of the respective intervals these lengths will be exactly equal or otherwise have a well defined mutual relation, also if the velocity as preferred is measured in more than two points or portions of the trajectory.

11 Claims, 4 Drawing Figures

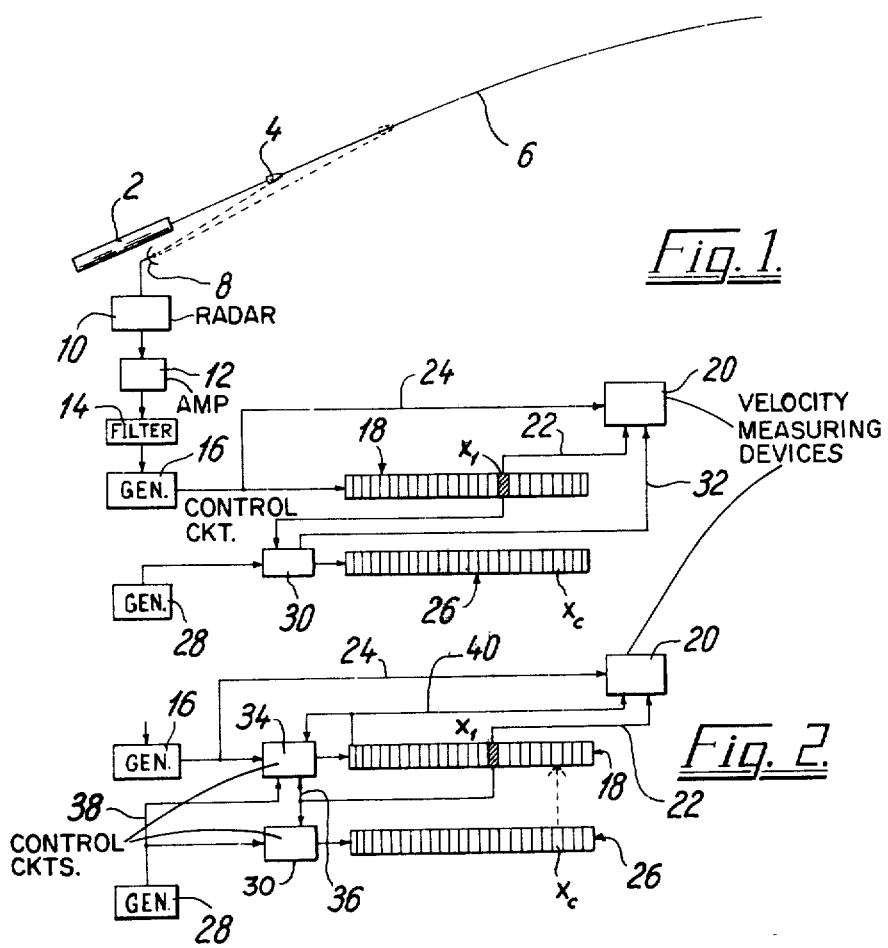
*Fig. 1.*
*Fig. 2.*
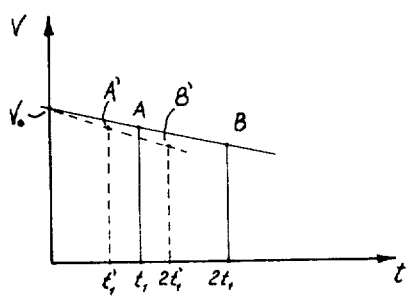
*Fig. 3.*
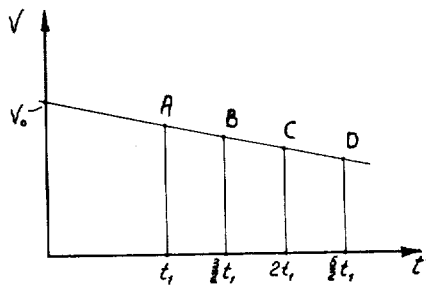
*Fig. 4.*

VELOCITY MEASURING DOPPLER RADAR

The present invention relates to a Doppler Radar device for measuring the velocity of an object moving in a trajectory, e.g. an artillery projectile, in at least two different measuring points or portions of the trajectory, including a transmitter-receiver-unit for producing a series of Doppler oscillations the momentary frequency of which is a function of the velocity of the object, a counter unit operable to count a predetermined number of Doppler oscillations occurring during the movement of the object along a first part of its trajectory until it reaches the first measuring portion thereof and to produce a first control signal in response to the predetermined counter stage being reached, registering means operable by said first control signal to register the frequency of the Doppler oscillations during the movement of the object along said first measuring portion of the trajectory, and control means for actuating velocity measuring means when the object has moved further to the next measuring point or portion of the trajectory.

It is well known that by means of the Doppler Radar principle it is possible to effect a velocity measuring on a projectile shot out from a gun, and that at the basis of such a measurement it is possible to calculate the so-called muzzle velocity which is an important factor. For different reasons it is difficult to make a velocity measurement immediately at the firing moment, so in practice it is preferred to make the measurement in a point or portion of the trajectory spaced somewhat from the muzzle, whereafter the muzzle velocity is calculated at the basis of several, more or less well defined parameters.

As well known the Doppler measurement is made by transmitting a radar signal from an antenna near the gun and by comparing the transmitted signal with the signal reflected from the flying projectile, whereby a small frequency deviation between the two signals can give rise to a low frequency Doppler signal, the frequency of which is proportional to the radial velocity of the projectile as seen from the radar antenna. In order to determine the radial velocity it is thus sufficient to measure the frequency of the Doppler signal, whereafter the real trajectory velocity and the muzzle velocity can be calculated. For the invention it is without significance how the frequency determination is made, but usually it is preferred to carry out an automatic registering of the ratio between a short measuring time interval and the number of Doppler oscillations within this time interval.

The muzzle velocity can be calculated at the basis of a measurement in one single point or portion of the trajectory, but, of course, the measuring accuracy will be increased when measuring in two or more points or measuring portions. The position of the measuring point or points can be chosen at the basis of different criterions, e.g. with predetermined lengths of the time intervals. However, the usability of the device would hereby be limited to measurements in a very narrow velocity range; the measurement ought to be made reasonably close to the gun, and if the time to the first measuring point is set in relation to a slow projectile the measuring point by later measuring on a rapid projectile will be situated two far out on the trajectory, and this disadvantage will be still more expressed if there is measured in more points. In practice it is preferred, therefore, to determine the position of the measuring point by counting a predetermined number of Doppler oscillations, whereby the measuring point will be positioned with a certain spacing from the gun independently of the projectile velocity.

In most of the known devices there is made a single measurement only, but it is known, however, to measure in two or three points, whereby also the mutual distance between the measuring points is determined by consecutive counting of the Doppler oscillations during the further movement of the projectile.

The velocity of the projectile decreases in a substantially even manner as a function of the distance, so when measuring in two or more points of a well defined location it is relatively easy, therefore, to calculate the muzzle velocity manually or by means of a computer, since the muzzle velocity can be graphically determined by means of a connection line between the measuring points in a velocity-distance-diagram or a velocity-time-diagram, in which the intersection between the said line of connection and the velocity axis will be representative of the muzzle velocity. In order to obtain an accurate result it is essential that the location of the measuring points are very well defined, and generally this has been difficult to obtain because there is a limitation in the accuracy with which the Doppler oscillations can be counted. Immediately upon the firing of the gun there often occurs so much electrical noise that a clear Doppler signal can entirely disappear, and even with the use of a filter allowing signals having the expected Doppler frequency to pass the counting will nevertheless easily be less accurate. Also farther in the trajectory counting pulses may be lost or false pulses may be received.

It is the purpose of this invention to provide a Doppler Radar device of the type referred to by means of which it is possible to improve the accuracy of the measurements.

The device according to the invention makes use of the known principle that the first measuring point is determined by counting a predetermined number of Doppler oscillations, i.e. it is accepted that the first measuring point is defined with a certain inaccuracy as far as its spacing from the muzzle is concerned, but the invention is based at the idea that this inaccuracy should not necessarily influence the accuracy of the measuring results when care is taken that the next measuring point or -points or -portions are determined at a time base so as to be located in a timely well defined manner relatively to the flying time of the projectile between the muzzle and the first measuring point. If for example the time interval from the first to the second measuring point is exactly the same as the time interval from the firing moment to the first measuring point it will be unimportant for the calculation of the muzzle velocity whether the actual distance between the points is larger or smaller, since the said line of connection between the ponts will nevertheless intersect the velocity axis at the same place, namely at the correct place, so the measuring points defined in this manner may be used for a very exact calculation of the muzzle velocity.

In accordance herewith the invention provides for a Doppler Radar device in which said control means include time measuring means operable to register the length of the time interval during which the object moves along said first part of its trajectory until said preselected counter stage is reached, and further including timer means operatively connected with said time measuring means so as to be adjusted to a time delay proportional to the time interval measured by said time measuring means, said timer means being connected to said counter so as to be operable to start its timing action in response to said preselected counter stage being reached, and said timer means being operatively connected to said velocity measuring means so as to actuate these means means in response to the timer means producing a control signal at the end of the time delay period set in the timer means.

Hereby the actual lapse of time from the firing moment to the first measuring point is automatically registered, and thereafter this registation is utilized for controlling the time interval to the next measuring point in such a manner that the two time intervals become uniform or otherwise interrelated in an exact, well known manner. An exact calculation of the muzzle velocity can be made at the basis of this well known interrelation between the measuring moments without the absolute magnitude of the time intervals having any influence on the measuring result, i.e. it is without importance that the first measuring point has been determined by an inaccurate counting of Doppler oscillations.

In the known devices there is a further disadvantage connected with the determination of the location of the measuring points by counting Doppler oscillations therebetween, namely that the Doppler oscillations are relatively low frequency, so there is not defined any sharp moment of time by the counting of a predetermined number of oscillations. In connection with the invention the time registering means and the timing means may easily be adapted so as to register and thereafter reproduce time intervals of a very exact length.

As specified in the following the device according to the invention can be constructed in a simple manner because the time registering means as well as the timer means can be made as simple counters working with clock-pulses of relatively high frequency, and in a simple manner the system can be adapted to carry out repeated measurements in as many points as desired.

The invention, by way of example, is described in more detail in the following with reference to the accompanying drawing, in which:

FIG. 1 is a schematic diagram of an embodiment of a device according to the invention, while FIG. 2 is a corresponding diagram of a modified embodiment, and FIGS. 3 and 4 are graphic illustrations of the location of the measuring points.

In FIG. 1 there is shown a gun barrel 2 from which there is shot out a projectile 4 flying in a trajectory 6. Near the gun barrel there is mounted a radar antenna 8 and an associated radar set 10 by means of which a radar signal is sent towards the rear end of the flying projectile. A small portion of this signal will be reflected by the projectile and be received in the antenna 8. Since the projectile is moving away from the antenna the reflected radar signal will have a slightly decreased frequency compared with the transmitted signal, and by mixing the two signals there is produced a low frequency signal which is passed through an amplifier 12 and a filter 14 to a pulse generator 16 from which the signal now shaped as pulses is supplied to a counter 18. In a manner not shown but well known this counter is adapted to start counting of the Doppler pulses at the firing moment of the gun, and it is made so as to produce a control signal to a velocity measurement device when a preselected counter stage $x_1$ has been reached. $x_1$ can be the last stage of the counter, but as mentioned below it will normally be preferable to have at disposal more counter stages than corresponding to $x_1$.

The velocity measurement device is designated 20. It is connected with the counter stage $x_1$ by means of a control wire 22 and with the output terminal of the pulse generator 16 by means of a wire 24. At the moment the said control signal is produced from the counter stage $x_1$ the measuring device 20 starts counting a number of Doppler oscillations, e.g. 128 oscillations corresponding to a measuring base of a little less than two meters, and it automatically measures the time for these oscillations so as to enable a determination of the average oscillation frequency and therewith of the moving velocity in the direction away from the antenna 8. As mentioned, however, it is without importance in this connection how the frequency determination and velocity measurement is made. Different possibilities in this respect are described in our U.S. Pat. No. 3,365,716.

According to the invention there is made a registration of the time elapsing from the firing moment until the counter stage $x_1$ has been reached. In a preferred embodiment as shown in FIG. 1 this registration is made by means of an additional counter 26 which is started simultaneously with the counter 20 and which is fed by clock-pulses from a pulse generator 28. The counter stage $x_1$ in the counter 18 is connected to a control circuit 30 adapted so as to stop the counting of the clock-pulses in response to the stage $x_1$ being reached. As an example the counting in the counter 26 has then proceeded to the stage $x_c$.

If only one further measuring point is desired the device can be so adapted that the circuit 30 serves to reverse the direction of counting in the counter 26 in response to the appearance of the control signal from the counter stage $x_1$, so that thereafter the counter 26 is counted down from the stage $x_c$; when thereafter the counter 26 has been counted entirely down it produces a control pulse which is fed to the velocity measuring unit 20 through a wire 32. The counting down of the counter 26 being made with the same clock-pulses as those used for its counting up it will be ensured that the time between the two measuring points will be exactly the same as the time interval from the firing to the first measuring point. However, it is perfectly possible to control the counting down of the counter 26 by means of a multiplied clock-pulse frequency, whereby the said intervals will not be of equal lengths, but the ratio between their lengths will be accurately known, whereby they enable an exact calculation of the muzzle velocity to be made.

In order to further increase the measuring accuracy it can be desirable to carry out a velocity measurement in several points along the trajectory, and in order to constantly maintain the time base defined by the registered time interval from the firing to the first measuring point it is necessary to use a memory unit for the length of this time interval so as to enable the counter 26 to repeatedly count up to or down from the relevant counter state $x_c$. To end it would be possible to use an extra counter connected with the counter 26 in such a manner that it will be adjusted to the counter stage $x_c$ by the appearance of the control pulse from the counter stage $x_1$ in the counter 18, whereafter the stage $x_c$ is maintained in the additional counter, whereby this counter would be usable as a "master" for readjustment of the counter 26 every time this counter has been counted up to or down from the stage $x_c$.

However, according to a special feature of the invention the said additional counter may be constituted by the counter 18. This counter is primarily adapted to count Doppler oscillations, but only between the firing moment and the first measuring point, whereafter is is usable for other purposes as soon as this point has been reached.

This arrangement is illustrated in FIG. 2. In the input to the counter 18 there is provided a control circuit 34 which is connected to the counter stage $x_1$ through a wire 36 and to the clock-pulse generator 28 through a wire 38. The circuit 34 is so adapted that by the appearance of a control signal from the counter stage $x_1$ it switches off the supply of Doppler oscillations from the pulse generator 16 and instead connects the counter input terminals with the clock pulse generator 28. The counter 26 is so adapted that it maintains the counter stage $x_c$ by the occurrance of the control signal from the counter stage $x_1$, and the two counters are interconnected in such a manner that the counter 18 will automatically be reset at the counter stage $(x_c)$ which has been reached in the counter 26 when the control pulse from the stage $x_1$ occurs; in a manner not illustrated the counter 18 is made non-sensitive to following passages of the counter stage $x_1$. Immediately upon the resetting of the counter 18 to the stage $x_c$ there is started a counting down of this counter by means of the clock-pulses from the generator 28, and when the counting down has been completed an actuation signal is sent to the velocity measuring unit 20 through a wire 40. Concurrently herewith the counter 18 is automatically reset at the stage $x_c$ which is transferred from the counter 26, this counter now acting as a memory unit, and in this manner it will be possible to repeat the measurements in as many points as desired. All the time there will be a well defined time interval between the measuring points when the clock-pulse frequency used is either constant or is a known multiple or fraction of the original clock-pulse frequency.

It should be mentioned that at this place it is deemed unnecessary to describe the counters and the control and transfer circuits thereof in more detail, since for the detailed design of the systems it is possible to use quite elementary construction and connection principles, and it is believed that any person skilled in the art will be able to provide, even in more different manners, the systems working according to the principles here disclosed. Additionally, it is considered unnecessary to describe the use of a computer for calculating the muzzle velocity on the basis of consecutive measuring results provided by the velocity measuring unit 20 since such utilization is known in the art.

In FIG. 3 there is shown a time-velocity-diagram in which there is indicated two measuring points A and B measured at the moments $t_1$ and $2t_1$. The line of connection between A and B intersects the velocity axis in the point $V_o$ which is representative of the muzzle velocity. In the same diagram the same velocity values A' and B' are marked at other moments of time, $t_1'$ and $2t_1'$, respectively, and it will be seen that the line of connection between these points will also intersect the velocity axis in $V_o$. Thus, the calculation of the result will be the same irrespectively of a lack of knowledge of the absolute lengths of the time intervals.

FIG. 4 illustrates a measurement made in more than two points and where the intervals between the measuring points are equal to half the time interval from the firing time to the first measuring point; the intervals may be still smaller, e.g. one-eighth of the first interval, when a correspondingly multiplied clock-pulse frequency is used. For obtaining a high accuracy there is preferably used a clock-pulse frequency which is larger than the Doppler frequency. However, the invention is not limited to the time measuring and time delay control being effected by means of counters, since other time registering principles may be used, e.g. a condensor which is progressively charged during the counting of Doppler oscillations out to the first measuring point, whereafter the condensor voltage built up hereby is used as a master for producing a time delay proportional to the length of the first time interval in order to determine the moments of the next measuring point or points.

The invention also comprises the disclosed method of determining the location of the measuring points by registering the lapse of time until the first point and thereafter use the result of this registering for positively defining the length of the following time interval or intervals to or between the next point or points, respectively.

What is claimed is:

1. A Doppler Radar device for measuring the velocity of an object moving in a trajectory in at least two different measuring points or portions of the trajectory, said device comprising transmit-receive unit means for producing a series of Doppler oscillations the momentary frequency of which is a function of the velocity of the object, counter means for counting a predetermined number of Doppler oscillations ocurring during the movement of the object along a first part of its trajectory until it reaches the first measuring portion thereof and for producing a first control signal in response to the predetermined count in said counter means being attained, means for measuring the velocity of the object including frequency registering means responsive to the first control signal for registering the frequency of the Doppler oscillation at least during the movement of the object along the first measuring portion of the trajectory, and control means for controlling said velocity measuring means at least when the object has moved to the next measuring point or portion of the trajectory, said control means including time measuring means for registering the length of a first time interval during which the object moves along the first portion of its trajectory until the predetermined count of said counter means is attained and for providing a second time interval proportional to the first time interval, said time measuring means being responsive to said counter means attaining the predetermined count for initiating timing of the second time interval and providing a second control signal to said velocity measuring means upon completion of the second time interval so as to permit determination of the velocity of the object.

2. A Doppler Radar device according to claim 1, wherein said counter means includes a counter having a plurality of counter stages and producing the first control signal in response to the predetermined counter stage being reached.

3. A Doppler Radar device according to claim 2, wherein said time measuring means includes clock pulse generator means and counting means for counting clock pulses therefrom, said counting means being operable to start counting clock pulses simultaneously with said counter means starting the counting of Doppler oscillations in response to the object starting its movement along its trajectory, said counting means being responsive to the first control signal from said counter means to stop counting in a respective stop counter stage thereof corresponding to the second time interval to be counted, said counting means being operable to start counting clock pulses in response to said stop counter stage being reached and to continue counting for the second time interval and producing the second control signal in response to completion of the second time interval.

4. A Doppler Radar device according to claim 3, wherein said counting means includes a down counter which is set at a counter stage thereof, said down counter counting down from said counting stage to produce the second control signal upon completion of the counting down.

5. A Doppler Radar device according to claim 3, wherein said counting means includes an up counter which is set at a counter stage thereof, said up counter counting up to said counter stage.

6. A Doppler Radar device according to claim 3, wherein said counting means comprises counting unit means for counting clock pulses from an initial counter position thereof forward up to said respective stop counter stage, and controlling unit means responsive to said stop counter stage being reached for starting said counting unit means counting clock pulses in a reversed counting direction and producing the second control signal in response to the counting unit means having counted back to its initial position.

7. A Doppler Radar device according to claim 6, wherein said clock pulse generating means includes means for providing clock pulses to said counting unit means when counting in the reversed direction at a frequency which is a multiple of the clock pulse frequency supplied to said counting unit means when counting in the forward direction.

8. A Doppler Radar device according to claim 3, wherein said time measuring means includes means for maintaining the count of the stop counter stage in response to the stop counter stage being reached.

9. A Doppler Radar device according to claim 1, wherein said time measuring means includes memory means for memorizing the length of the first time interval, and controlling unit means for transferring the memorized time interval length to said time measuring means.

10. A Doppler Radar device according to claim 9, wherein said time measuring means includes counting means having a predetermined stop counter stage and operable as said memory means to maintain the count of the stop counter stage in response to the stop counter stage being reached, said counter means being set at a timing counter position in accordance with the stop counter stage of said counting means, said controlling unit means resetting said counter means at said timing counter position and restarting the counter means in response to the second control signal.

11. A Doppler Radar device according to claim 1, wherein said counter means for counting a predetermined number of Doppler oscillations during the movement of the object along a first part of its trajectory serves for counting the second time interval, said counter means being connected with said time measuring means for resetting at a counter stage thereof corresponding to a respective stop counter stage of said time measuring means in response to the first control signal, said control means being responsive to the first control signal for concurrently connecting a timing clock pulse generator to said counter means so as to enable operation of said counter means to count the second time interval.

* * * * *